United States Patent [19]
Kintz et al.

[11] Patent Number: 5,343,613
[45] Date of Patent: Sep. 6, 1994

[54] METHOD OF INSTALLING THERMAL PROTECTION FOR AN ELECTRIC MOTOR STATOR

[75] Inventors: Lawrence J. Kintz; David W. Okey, both of Rockford, Ill.; Joseph F. Leicht, Placentia, Calif.; Francis T. Carriglitto, Rockford, Ill.; Colum O'Hare, San Diego, Calif.; Keith E. Garr, Rockford, Ill.; Valerie Clark, Corona, Calif.

[73] Assignee: Sundstrand Corporation, Rockford, Ill.

[21] Appl. No.: 9,720

[22] Filed: Jan. 27, 1993

[51] Int. Cl.⁵ .................................. H02K 15/06
[52] U.S. Cl. ............................ 29/596; 310/43; 310/68 C
[58] Field of Search ............ 29/596, 598; 310/68 C, 310/71, 42

[56] References Cited

U.S. PATENT DOCUMENTS

| | | |
|---|---|---|
| 1,947,078 | 2/1934 | Cogg . |
| 2,471,840 | 5/1949 | Seely . |
| 3,131,322 | 4/1964 | Pleiss, Jr. et al. . |
| 3,200,274 | 8/1965 | Munier . |
| 3,422,313 | 1/1969 | Snoberger et al. . |
| 4,188,553 | 12/1980 | Wheaton . |
| 4,571,518 | 2/1986 | Kuntz, Jr. et al. . |
| 4,926,077 | 5/1990 | Gauthier et al. . |

*Primary Examiner*—Carl E. Hall
*Attorney, Agent, or Firm*—Wood, Phillips, VanSanten, Hoffman & Ertel

[57] ABSTRACT

Plastic deformation and nicking of the conductors (30) of the end turns (20) in the stator (10,12,14) of a dynamoelectric machine during the installation of a temperature sensor (26) is avoided by locating the temperature sensor (26) in a gap (22) between the coils defining adjacent end turns (20), thereby providing a machine capable of rapidly responding to excess heat even in a locked rotor situation before detectable levels of smoke, gas, and odors are generated.

7 Claims, 3 Drawing Sheets

METHOD OF INSTALLING THERMAL PROTECTION FOR AN ELECTRIC MOTOR STATOR

FIELD OF THE INVENTION

This invention relates to the construction of stators for electrical motors, and more particularly, to the provision of thermal protectors therefor. It also relates to a method of fabricating a stator for an electrical motor to include a thermal protector.

BACKGROUND OF THE INVENTION

Many electrical machines having electrical windings have a requirement for high reliability. While this requirement is applicable to many different types of electrical machines, including dynamoelectric machines such as motors or generators, it is especially applicable to motors and generators used in aircraft due to the high costs associated with replacement or repair as well as the need for unfailing operation in flight.

It is well known that, where such high reliability is required, it is desirable to provide means for protecting the electrical machine against damage due to overheating. Typically, such protection means include a temperature sensitive device disposed within the electrical machine to detect a rise in temperature, in conjunction with a thermal protection circuit connected to the temperature sensitive device and configured to cause electrical power to the electrical machine to be interrupted before the electrical machine is adversely affected.

There are applications for electrical machines, such as motors or generators located within passenger compartments of aircraft or within living spaces of a building, where in addition to protecting the electrical machine from damage due to overheating, it is required that the electrical machine be protected in a manner which precludes the formation of smoke, noxious gases, or odors which could be detected by, and lead to anxiety among passengers or crew of the aircraft, or occupants of such a living space.

Such smoke, gases, or odors are typically generated by overheating of materials such as wire insulation, potting compounds, or lubricants utilized within the electrical machine, which typically begin to decompose, oxidize, or outgas when exposed to elevated temperatures. Unfortunately even for the best such materials presently available, the temperature at which detectable levels of smoke, gas, or odor are produced, is considerably lower than maximum safe operating temperatures which are typically considered acceptable in applications where protection of the electrical machine against damage due to overheating is the sole concern.

Accordingly, in designing an electrical machine for use in applications where the generation of smoke, gases, or odors is not permissible, it is imperative that the means for protecting the electrical machine from overheating be capable of detecting an overheat condition and shutting down the electrical machine quickly enough to prevent the electrical machine from reaching a minimum temperature at which detectable amounts of smoke, gas or odor are produced.

Such protection systems have utilized various types of strategically positioned temperature sensitive devices, including thermally actuated fuses or switches, and solid state sensors such as thermistors, which product a change in circuit resistance in response to changes in temperature, to product a signal detectable by the protection circuit. While the exact choice of the type of temperature sensitive device and the location within the electrical machine is largely dictated by design requirements unique to a given electrical machine and application, it is well known that in order to provide optimum protection and to achieve the fastest response time, the temperature sensitive device should ideally be located at a point within the electrical machine where a so-called hot spot is most likely to occur under abnormal operating conditions.

In a dynamoelectric machine, such as a motor or generator, it is further well known that such a hot spot is most likely to occur in end turns of the stator of such a motor or generator. This is due to the fact that a potential overheating problem due to an electrical malfunction, such as a short circuit or locked rotor, will typically manifest itself through a rapid increase in current flow within the electrical machine which in turn results in increased heat generation and rapid rise in the temperature of the stator, as well as the rotor. Experience has shown that, in such an instance, the temperature of the stator end turns will increase more rapidly than other elements within the electric machine due to the fact that the end turns have less mass and are not cooled as effectively as the other elements within the electrical machine.

As a result, it is common practice to include a temperature sensitive device in the form of one or more small thermally actuated switches in the end turns of stator windings, of dynamoelectric machines such as motors or generators. These switches typically include small bimetallic elements configured so as to open and close when a certain temperature is reached. The opening or closing of the switch in turn opens or closes an electrical circuit which is employed with other equipment such as a thermal protection circuit to shut down the dynamoelectric machine before it overheats to the point of damage or generating smoke, etc. Following shut down of the machine, the high temperature gradually dissipates, and ultimately the switch will revert to its original condition, restoring the electric circuit to its former state. This can be used as a means to automatically restore the electrical machine to service.

While this basic approach is conceptually simple, actual implementation is found to be difficult by virtue of the fact that the temperature sensitive device must be installed in a manner which ensures intimate contact with the end turns of the stator in order to achieve adequate protection and fast response times.

Through the years many different variations on the basic approach to providing protection of such electrical machines against damage due to overheating, and methods for improving the response time of such protection, have been developed, as exemplified by U.S. Pat. Nos. 1,947,078; 2,471,840; 3,131,322; 3,200,274; 3,422,313; 4,188,553; 4,571,518; and 4,926,077.

In one commonly utilized variation of the basic approach, the temperature sensitive device is installed directly into the end turns during winding of the stator, and the end turns are subsequently compressed and plastically deformed to obtain contact with the temperature responsive device. While this approach results in reasonably good contact between the end turns and the temperature responsive device, the temperature responsive device and the end turns are prone to damage during fabrication of the stator.

In another approach, heat transfer devices, such as heat sinks, insulators or shields, or pocket devices for holding the temperature sensitive device, are inserted into the stator either during or subsequent to winding of the end turns, and the temperature sensitive device is attached or inserted following completion of winding of the stator. While this approach does provide protection against damage to the thermally sensitive device during fabrication of the stator, the thermal response of such an installation is typically slower than when the temperature sensitive device is in intimate contact with the end turns, due to the increased thermal resistance incurred as a result of addition of the heat transfer or pocket device into the heat transfer path between the end turns and the temperature sensitive device. In addition, with this approach the end turns must typically be compressed or otherwise plastically deformed about the heat transfer or pocket device in order to ensure adequate thermal contact, thereby exposing the end turns to potential damage during fabrication of the stator.

In yet another approach, an installation tool is forced between adjacent end turns to form a pocket which allows insertion of the temperature sensitive device, and following insertion of the temperature sensitive device, the end turns are compressed and laced in place to provide intimate thermal contact between the end turn and the temperature sensitive device. This approach suffers from a number of problems, including the fact that insulation on the end turns may be nicked or scratched during the process of inserting the sensor, and that successful installation is highly dependant on the skill of the technician. Furthermore, experience has shown that, in order to insert the temperature sensitive device in this manner, the end turns must be plastically deformed, creating the potential for mechanical failure of the end turns if they are subjected to inertial or vibratory stress in operation of the dynamoelectric machine.

A common disadvantage of the various approaches described above is that, by virtue of the plastic deformation, the resistance of the end turn in the vicinity of the temperature sensor will be changed due to "working of the wire" caused by bending of the wire and/or by tension being applied to the wire during insertion of the temperature sensing device into the end turn, or during the subsequent compressing and compacting of the end turns of the stator after the temperature sensor has been placed therein. This increase in resistance may subsequently lead to the development of a hot spot in the area of the wire which has been plastically deformed, which can eventually cause a failure of the wire, or the insulation system in the vicinity of the temperature sensitive device, particularly where end turns are tightly packed, as a result of precision winding, or where the wires are subjected to high current densities.

Where an electric machine includes a significant thermal mass and operates at a relatively low current density, such as may be the case in an industrial or commercial dynamoelectric machine, the various approaches described above may be adequate to prevent the generation of detectable levels of smoke, gas, or odors, by virtue of the fact that the rate of temperature increase for such a machine under abnormal operating conditions may be slow enough to allow utilization of a means for protecting the electrical machine having a relatively slow response time.

Unfortunately, even where the problems defined above have been overcome, in those applications where the electrical machine must be extremely compact, lightweight (i.e. have minimal thermal mass), and operate at high current densities, as is typical of dynamoelectric machines in aerospace applications, it is believed that the prior art has heretofore failed to produce a thermal protection means which is capable of responding quickly enough to prevent the generation of smoke or odor detectable by passengers or crew members in an aircraft when an abnormal condition such as a locked rotor is encountered.

What is needed then is a compact, lightweight dynamoelectric machine capable of operation with high current densities and having a stator, including a temperature sensor installed in the stator in a manner which provides enhanced thermal conduction resulting in a response to abnormal temperature which is sufficiently fast to prevent the formation of smoke or odor detectable by passengers on an aircraft which may be installed into the stator in a manner not requiring plastic deformation of the end turns.

SUMMARY OF THE INVENTION

It is the principal object of the invention to provide a new and improved stator for a dynamoelectric machine, which stator includes a temperature sensor.

An exemplary embodiment of the method of the invention achieves the foregoing object in a method including the steps of a) winding a dynamoelectric machine with a plurality of coils such that adjacent coils are separated by a small gap having a predetermined width, b) separating the coils of at least one pair of adjacent coils without plastically deforming the same, c) inserting a sensor having a dimension slightly larger than the gap before the performance of step b) into the gap between the separated coils, and d) allowing the coils to resiliently return toward their original positions. It is also an object of the invention to provide a new and improved method of fabricating a stator for a dynamoelectric machine which includes the installation of a temperature sensor.

As a consequence of this method, individual conductors in a coil are not separated and the coils themselves are subject only to a minor force sufficient to open the gap to receive the sensor. The forces are insufficient to cause undesirable nicking of the individual conductors forming the coils and because plastic deformation is not involved, the coils themselves tend to return resiliently toward their original positions and in so doing, capture the sensor in good thermal contact with the conductors of the coils.

In a preferred embodiment, the machine is a plural phase machine and the coils are grouped by phase. The sensor is inserted between adjacent coils of the same phase.

In one embodiment, the sensor has one side that is more temperature sensitive than an opposite side and the sensor is inserted so that the sensitive side is directed toward the greatest mass of coils in the grouping.

The invention also contemplates that the sensor include electrical leads and further includes the step of inserting the electrical leads in the gap into which the sensor is or is to be inserted.

Preferably, the step of inserting the electrical leads is performed so that the leads extend toward the outer periphery of the stator.

In a highly preferred embodiment, the method involves the fabrication of the stator of a three phase machine and includes a step of winding the stator to provide at least two groups of coils with each group including at least three coils of each phase. The coils of each phase further are adjacent to one another in a respective subgroup of coils and the coils at each subgroup are separated by a small gap. The sensor is inserted in such gap and the method is otherwise performed as mentioned above.

The stator of the invention includes a stator body having a rotor receiving opening. A plurality of slots are located in the body about the opening and a plurality of coils are disposed on the stator body. Each coil has a portion extending through a corresponding one of the slots to emerge therefrom in end turns at opposite ends of the body. The end turns extend somewhat helically outward in adjacency to but separate from the end turns of an adjacent coil by a small gap. A sensor is located in at least one of the gaps and electrical leads for the sensor are located in the one gap and extend away from the rotor receiving opening.

In a preferred embodiment, the end turns bordering the one gap capture the sensor in the one gap.

Preferably, the stator is for a multiple phase dynamoelectric machine and the coils are grouped in adjacency according to phase. The one gap is located between the end turns of two coils for a single one of the phases.

In one embodiment, the sensor is of the type having a relatively sensitive side and an opposite, relatively, insensitive side. Preferably, the sensitive side is disposed to face the larger one of the mass of end turns bounding the gap.

Other objects and advantages will become apparent from the following specification taken in connection with the accompanying drawings.

DESCRIPTION OF THE PREFERRED EMBODIMENTS

Figure 1:
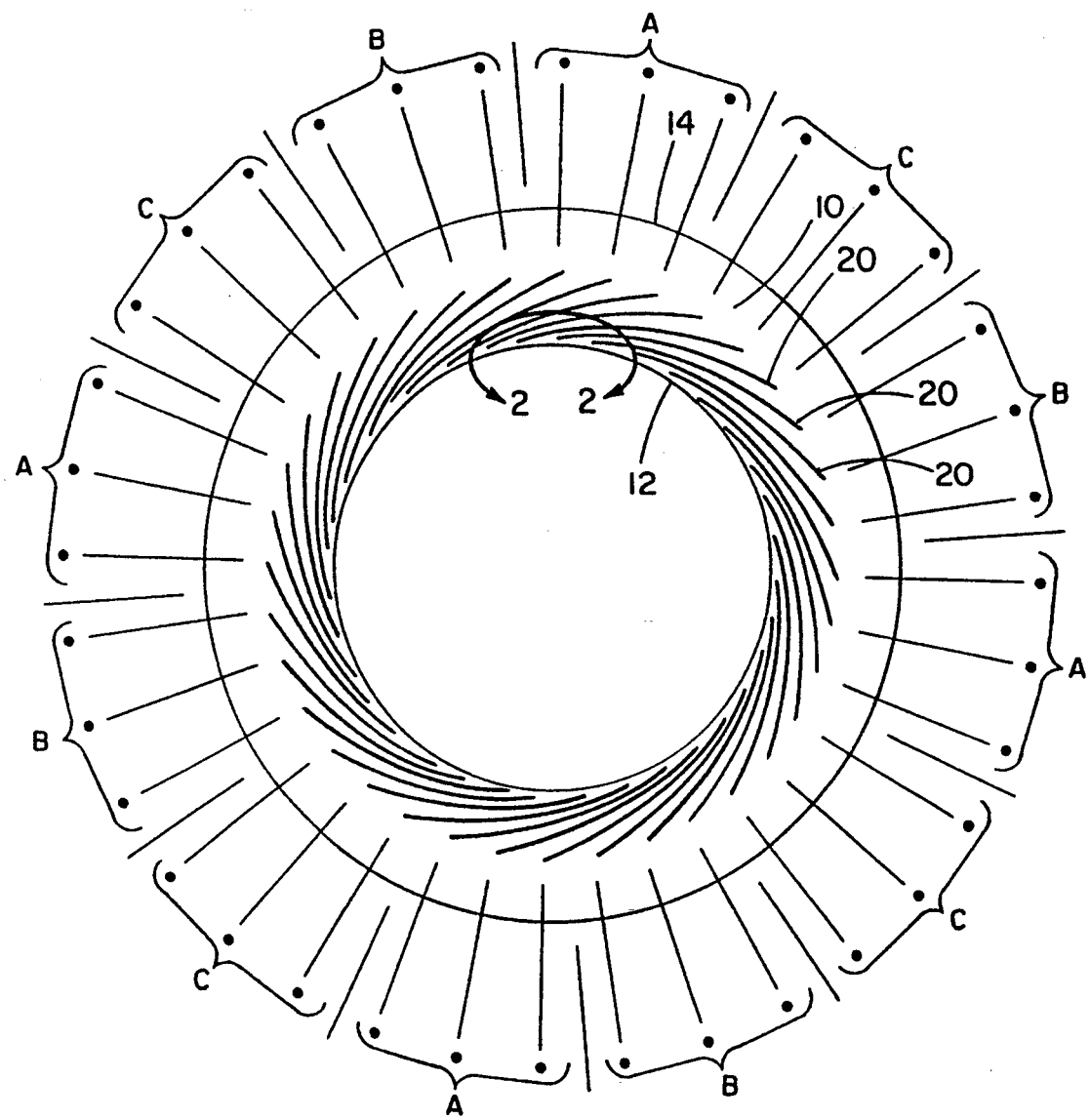
FIG. 1 is a somewhat schematic end view of a stator for a dynamoelectric machine and made according to the invention.

Referring to the drawings, the method of fabricating a stator and a stator made according to the invention will be described. As seen in FIG. 1, the stator is formed of a plurality of rings or laminations of ferromagnetic material placed in end-to-end abutting relation as is well known. The inner-periphery 12 of the abutted laminations 10 defines a rotor receiving opening 11 while the outer periphery 14 of the laminations 10 bounds the exterior of the magnetic part of the stator.

In the embodiment illustrated in FIG. 1, the stator is for a three phase machine. Thus, a plurality of groups of coils (each formed of one or more individual conductors) is provided. As illustrated in FIG. 1, four separate groups of coils for each of the three phases, phases a, b and c are provided. The groups are equally angularly spaced about the rotor receiving opening 12 and within each of the 12 groups, there are three coils, each conducting the same phase. As is well known, each of the coils in each group is connected in series.

Figure 2:
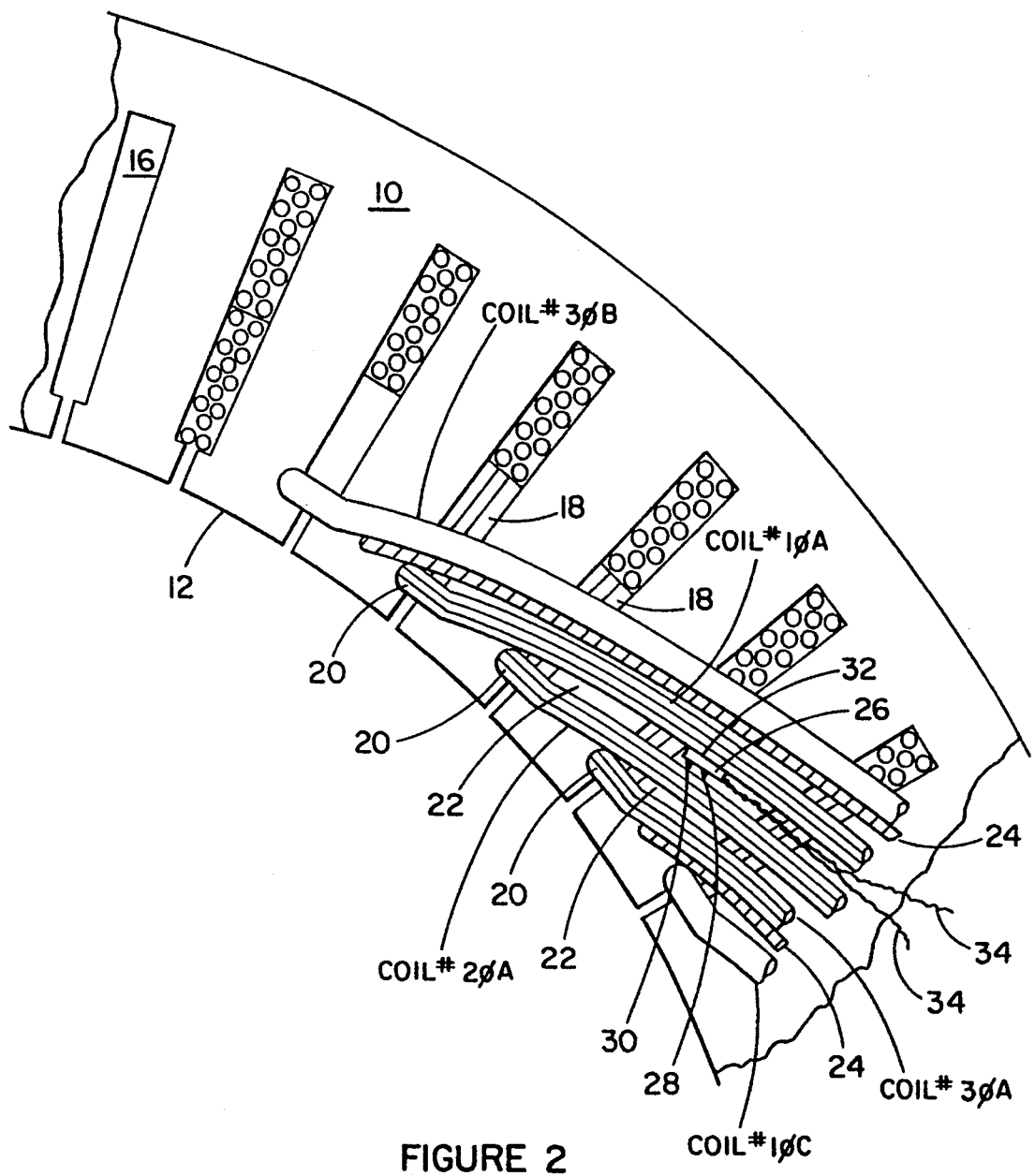
FIG. 2 is an enlarged, fragmentary view of part of FIG. 1.

As can be seen in FIG. 2, the rotor receiving opening 11 is surrounded by a plurality of generally T-shaped slots 16 in which the coils are wound. Individual conductors are shown at 18 and emerge from respective ones of the slots 16 to define end turns, generally designated 20. As seen in FIGS. 1 and 2, the end turns 20 extend away from the rotor receiving opening 12 towards the outer periphery 14 of the stator. Generally, the direction of extension may be regarded as helically outward.

As schematically illustrated in FIG. 1 and as shown more graphically in FIG. 2, small gaps 22 separate adjacent ones of the end turns 20 of adjacent coils.

Conventional phase separators 24 are located in the gaps 22 between the third coil of one phase and the first coil of the adjacent phase grouping.

According to the invention, in at least one gap 22, a temperature sensor 26 is located. The sensor 26 preferably is an insulated, bimetallic switch of the sort sold under the trademark or tradename "Tiny Stats" by Texas Instruments. The same are insulated in the manner more fully explained in the commonly assigned, copending application of Okey et al entitled "Thermal Protection For Electrical Machines", Ser. No. 08/009,822, the details of which are herein incorporated by reference.

This sort of a sensor 26 has a small projection 28 on its temperature sensing side 30. That is to say, the side 30 of the temperature sensing switch 26 is more sensitive to temperature changes than the opposite side 32. The sensor 26 also includes electrical leads 34 by which the same may be conventionally connected to a motor or generator protection circuit that will shutdown the dynamoelectric machine when the sensor 26 senses a temperature in excess of some predetermined level. As seen in FIG. 2, the leads 34 are inserted into the gap 22 that receives the switch 26 and directed towards the outer periphery of the stator, which is to say, directed away from the rotor receiving opening 12.

Figure 3:
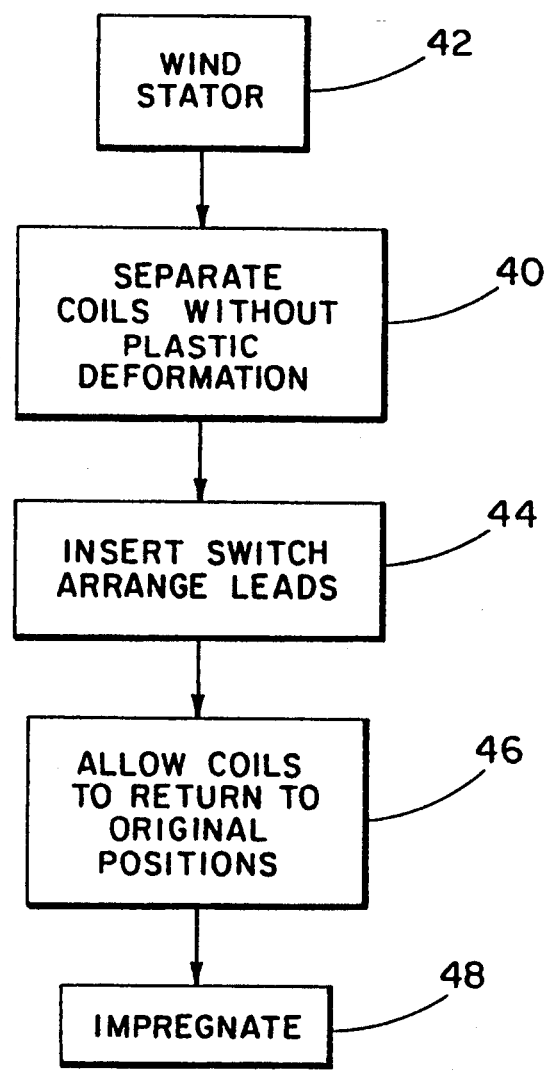
FIG. 3 is a block diagram illustrating steps in the method of the invention for fabricating a stator.

In a preferred embodiment, the dimension of the sensor 26 from the projection 28 to the side 32 is intended to be slightly greater than the distance between the closest conductors in the adjacent coils bounding the gap 22 in which the sensor 26 is received. When such is the case, it is possible to insert a small tool which preferably is made of a hard plastic or is at least plastic coated, between the adjacent coils defining the gap 22 which is to receive the sensor 26. The tool may then be used to separate those coils ever so slightly. Care is taken to avoid plastically deforming the coils which could result in the use of forces sufficient to nick individual conductors of each coil which, in turn, could lead to subsequent mechanical or electrical failure of the coil. This step is illustrated at a box 40 in FIG. 3, which step follows, of course, the step 42 of the winding the stator as mentioned previously. Once the desired separation is achieved, the switch 26 is inserted in the gap 22 and the leads 34 likewise located in the gap. The insertion step is designated 44 and when that is completed, the separating force applied to the adjacent coils is removed. Because the coils have not been plastically deformed, their inherent resiliency will tend to restore the coils to their original positions as illustrated in step 46. Where the dimension of the gap 22 with the coils in their original positions is chosen to be slightly less than the corresponding dimension of the sensor 26, as the coils return to their original positions, they will capture the sensor 26 between the coils and tightly embrace the same to establish good thermal contact therewith.

Thereafter, the coils may be varnish impregnated in the usual fashion as illustrated by step 48.

In some cases, it may be desirable to insert sensors to sense the temperature in each of the three different phases. In some instances it may be desired to insert an additional sensor at some other gap so that in the event the first sensor fails, a second, redundant sensor is already in place for easy incorporation into the motor shutdown circuit.

In some cases, the usual lacing may be applied about the coils contacting the sensor 26 to assure that the same will not release their grip on the sensor 26 and allow the same to loosen or otherwise lose good thermal contact with the conductors making up the coil.

From the foregoing, it will be apparent that a stator having a sensor made according to the invention is such that the sensor is capable of sufficiently rapid response to heat to cause shut down before detectable odor, smoke or gas is generated. It will further be appreciated that the method of the invention allows installation of a thermal sensor in the end turns of the stator of a dynamoelectric machine in such a way as to eliminate the possibility of plastically deforming or nicking conductors in the end turns, thus precluding subsequent hot spot formation and associated problems. Thus, a source of short circuits and/or hot spots is eliminated.

What is claimed is:

1. A method of fabricating the stator of a dynamoelectric machine, comprising:
    a) winding a dynamoelectric machine with a plurality of coils such that adjacent coils are separated by a small gap;
    b) separating the coils of at least one pair of adjacent coils without plastically deforming the same;
    c) inserting a sensor having a dimension slightly larger than said gap before the performance of step c) into the gap between the separated coils; and
    d) allowing the coils to resiliently return toward their original positions.

2. The method of claim 1 wherein said machine is a plural phase machine, said coils are grouped by phase, and said sensor is inserted between adjacent coils of the same phase.

3. The method of claim 2 wherein said sensor has one side that is more temperature sensitive than an opposite side and said sensor is inserted so that said one side is directed toward the greatest mass of coils in the grouping.

4. The method of claim 1 wherein the sensor includes electrical leads and further including the step of inserting the electrical leads in the gap into which said sensor is located or is to be inserted.

5. The method of claim 4 wherein the step of inserting the electrical leads is performed so that the leads extend toward the outer periphery of the stator.

6. A method of fabricating the stator of a three phase dynamoelectric machine comprising:
    a) winding the stator to provide at least two groups of coils, each group including at least three coils of each phase with the coils of each phase being adjacent to one another in a respective subgroup of coils with the coils in at least one subgroup being separated by a small gap;
    b) separating the coils on each side of said gap without plastically deforming the coils; and
    c) inserting a temperature sensor within said gap such that any most sensitive part of the sensor is facing the greater number of coils in said one subgroup.

7. The method of claim 6 wherein step c) is followed by the step of allowing the separated coils to capture the sensor.

* * * * *